(12) United States Patent
Strauss

(10) Patent No.: US 11,790,459 B1
(45) Date of Patent: Oct. 17, 2023

(54) METHODS AND APPARATUSES FOR AI-BASED LEDGER PREDICTION

(71) Applicant: Proforce Ledger, Inc., Ridgefield, CT (US)

(72) Inventor: Robert Strauss, South Salem, NY (US)

(73) Assignee: Proforce Ledger, Inc., Ridgefield, CT (US)

( * ) Notice: Subject to any disclaimer, the term of this patent is extended or adjusted under 35 U.S.C. 154(b) by 0 days.

(21) Appl. No.: 18/125,212

(22) Filed: Mar. 23, 2023

(51) Int. Cl.
  *G06Q 40/08* (2012.01)
  *G06N 20/00* (2019.01)

(52) U.S. Cl.
  CPC ............ *G06Q 40/08* (2013.01); *G06N 20/00* (2019.01)

(58) Field of Classification Search
  CPC ................................ G06Q 40/08; G06N 20/00
  See application file for complete search history.

(56) References Cited

U.S. PATENT DOCUMENTS

| 10,963,786 | B1* | 3/2021 | Taylor | G06N 3/045 |
| 11,063,945 | B2 | 7/2021 | Anders | |
| 11,081,219 | B1* | 8/2021 | Dods | G06N 20/00 |
| 2020/0364183 | A1 | 11/2020 | Zhou | |
| 2021/0134095 | A1* | 5/2021 | Milt | A24F 40/65 |
| 2022/0027350 | A1 | 1/2022 | Chaudhry | |

* cited by examiner

*Primary Examiner* — Edward Chang
(74) *Attorney, Agent, or Firm* — CALDWELL INTELLECTUAL PROPERTY LAW

(57) ABSTRACT

Apparatuses and methods for AI-based ledger prediction are provided. A processor is configured by instructions on a memory to receive and categorize a ledger file to a ledger type based on the data contained within the ledger file. The ledger data may contain information related to an insurance policy and investments made based on the payments into the policy over a period of time. The processor may be configured to utilize machine learning to generate a prediction of a value or values related to the ledger data, for example a retirement distribution amount.

18 Claims, 9 Drawing Sheets

METHODS AND APPARATUSES FOR AI-BASED LEDGER PREDICTION

FIELD OF THE INVENTION

The present invention generally relates to the field of machine learning. In particular, the present invention is directed to methods and apparatuses for AI-based ledger prediction.

BACKGROUND

Insurance policies such as life insurance are paid into over the course of a customer's life and paid out relatively infrequently. This can result in a relatively large sum of money that might otherwise be used productively such as for an investment. However, it is difficult to predict how a user may want or need to use such a sum of money and how best to distribute or invest it.

SUMMARY OF THE DISCLOSURE

In an aspect, an apparatus for predictive ledger generation is provided. The apparatus includes a processor and a memory communicatively coupled with the processor, the memory containing instructions stored thereon. The instructions configure the processor to receive a ledger file containing ledger data, classify the ledger file to a ledger type, analyze the ledger file to identify one or more trends in the ledger data, and store the ledger file to an immutable sequential listing.

In another aspect a method for predictive ledger generation is provided. The method includes the steps of receiving, by a processor, a ledger file containing ledger data, classifying, by the processor, the ledger file to a ledger type, analyzing, by the processor, the ledger file to identify one or more trends in the ledger data, and storing, by the processor, the ledger file to an immutable sequential listing.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for predictive ledger generation and analysis using machine learning or artificial intelligence. In the insurance industry, particularly life insurance, a user will pay into a life insurance policy over the course of their lifetime and a pool of money will accrue to the insurance company. However, the money paid into the life insurance policy is frequently underutilized as an investment or tax-savings vehicle. A challenge related to utilizing paid-in premiums is predicting how an insurance ledger may grow or shrink over time as premiums increase, distributions are needed due to death or retirement, or other considerations. The present invention provides methods and apparatuses to do so.

Figure 1:
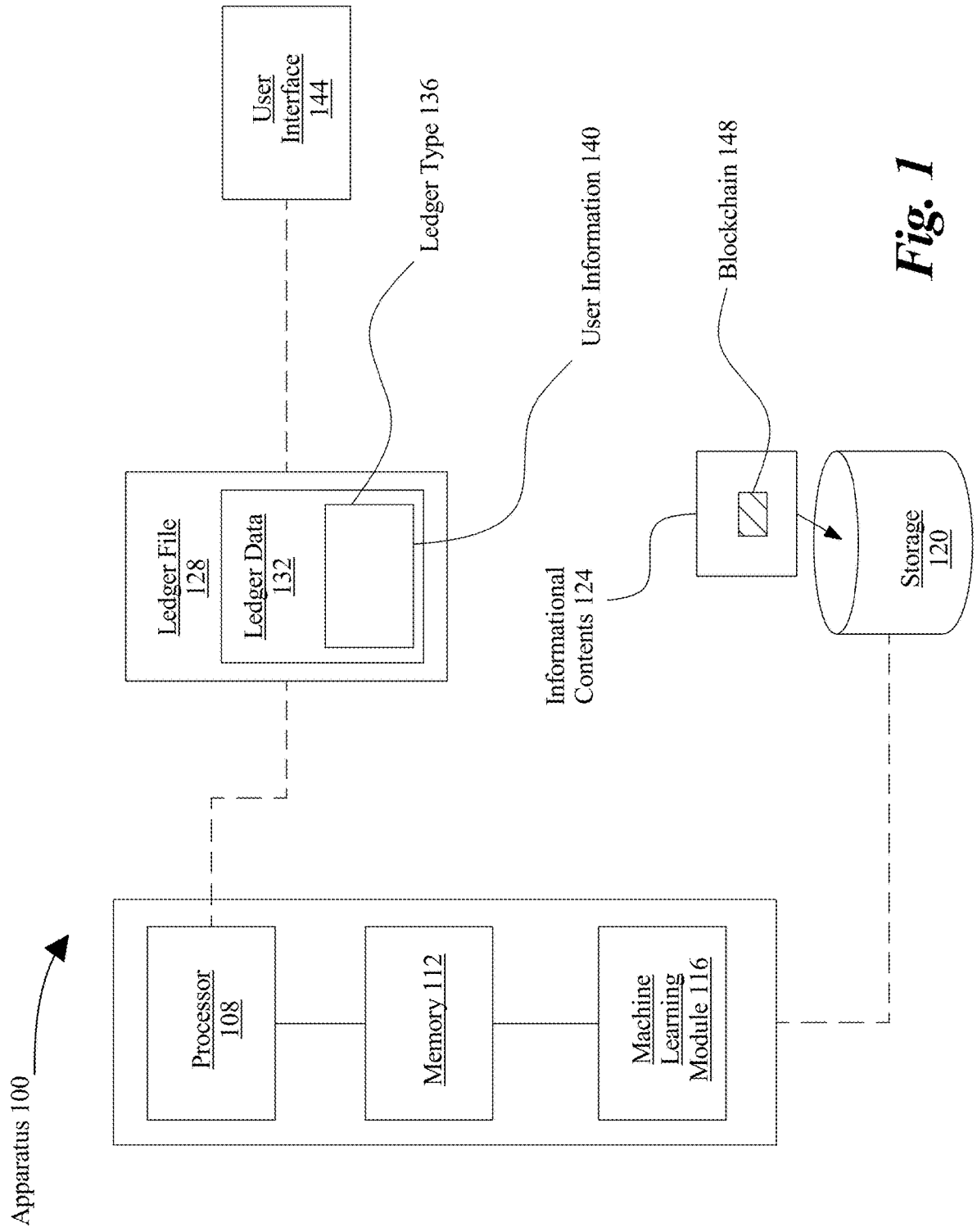
FIG. 1 is a diagram illustrating an apparatus for AI-based ledger prediction.

Referring now to FIG. 1, an exemplary embodiment of an apparatus 100 for AI-based ledger prediction is illustrated. Apparatus 100 includes a computing device 104. Computing device 104 includes at least one processor 108 and at least one memory 112 communicatively coupled to the processor 108. Processor may include, without limitation, any processor described in this disclosure. Computing device 104 may include a machine learning module 116. Computing device 104 and/or processor 108 may be communicatively coupled with a storage 120. Processor may be included in a computing device. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 108 may be communicatively coupled with a storage 120. "Storage" is defined as any device capable of storing information. Storage 120 may be any data storage in accordance with this disclosure including a hard drive, cloud storage, distributed cloud storage, server, solid-state hard drive, magnetic tape storage, paper, written records, an object containing an indication of data or a datum, and the like. Storage 120 contains informational contents 124. "Informational contents" are defined herein are one or more datum elements that contain, store, or indicate information. Informational contents 124 may include any data capable of being stored electronically. In some embodiments, storage 120 may include a database. A database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, processor 108 is configured to receive a ledger file 128 containing ledger data 132. A "ledger file," as used in this disclosure, is defined as a file containing one or elements of information related to transactions and/or aspects of insurance processes. A ledger file may be a data object such as a spreadsheet, a comma-separated values (CSV) file, a computer file, a plaintext document, a database or database object, an image, a graph, a model, a drawing, or any data object containing or storing digital information. A ledger file may be a physical file (e.g. a piece of paper, a written record, a printed record, a physical printout, a paper photocopy, and the like. "Ledger data," as used herein, is defined as one or more elements of information contained in a ledger file. Ledger data 132 may be in any suitable form including a graph, a database, a list, a dictionary, a spreadsheet, a table, a matrix, a column of numbers, words, or characters, and the like. In an embodiment, a ledger file may be an insurance ledger file. In an embodiment, ledger data 132 stored on ledger file 128 may contain information related to insurance premium, cash surrender value, accumulation value, death benefit, loan amounts, deductible, covered objects or people, maximum coverage level, a risk outlay value, distribution from the policy, and the like. Ledger data 132 may contain user information 140. For example, ledger data 132 may contain information related to identification of a user (such as name, date of birth, age, height, weight, sex, ethnicity, address, social security number, photographic information, and the like), information regarding a user's insurance status (e.g. existing policy data, covered items or people, coverage amounts, premium such as monthly premium, deductible such as yearly deductible, death benefit, loan amounts, loan types, a date or dates related to insurance coverage, and the like), one or more indications of external events that may have affected ledger data 132 (e.g. a car crash a user was in, an environmental event such as an earthquake, a flood, or a hailstorm, an unexpected medical event such as a heart attack or allergic reaction, a planned distribution or initiation of retirement income, death of a user or associated person, and the like) and the like.

With continued reference to FIG. 1, processor 108 is further configured to classify the ledger file 128 to a ledger type. As used herein, a "ledger type" is a classification of ledger indicating a subject to which the ledger relates or a subject about which the ledger contains information. As used herein, ledger type and ledger classification may be used interchangeably. In an embodiment, a ledger type may be an insurance ledger, a financial ledger, an investment ledger, a life insurance premium ledger, a planning ledger (e.g. a ledger of planned investments, distributions, withdrawals, premia, and the like), and the like. Additionally or alternatively, classifying the ledger file 128 to a ledger type 136 may include classifying the data within the ledger to one or more data structures within the ledger, such as a tab. For example, a ledger may contain data in three separate portions of the ledger file such as three separate pages, sheets, tabs, and the like. Classifying the ledger file 128 to a ledger type 136 may include classifying ledger data 132 within the ledger to one or more of the portions of the ledger file. For example, a ledger file 128 may include a tab with monthly premium deposits, a second tab with cumulative policy value measured each month, and a third tab with monthly return on investment. Processor 108 may classify the ledger data 132 by moving the ledger data 132 into a portion of ledger file 128 in response to a determination that some or all of ledger data 132 matches a data pattern such as a range of values, a uniformity of values (e.g. monthly premium data may fit a pattern of each data element of the analyzed portion of ledger data 132 being the same for 12 entries and increases by 5% or less every 12th entry), a magnitude of values, or a trendline as described below. In an embodiment, processor 108 may perform a curve fit to some or all of ledger data 132 and may classify the fitted ledger data 132 to a particular tab based on the determined fit. Processor 108 may classify ledger file 128 based on the classification of ledger data 132, for example by determining that the ledger data 132 matches one or more categories that processor 108 is configured by instructions contained on memory 112 to associate with a particular category. In an embodiment, processor 108 may determine that ledger data 132 contains a number of categories associated with a particular ledger type. For example, ledger data 132 may contain the categories of monthly premium and cumulative policy value and determine that ledger file 128 is of the life insurance ledger type.

A ledger file 128 may include formatting and style functionalities. A ledger file 128 may allow for the addition of multiple predictive ledgers, for example by the inclusion of additional tabs or sheets. A ledger tab may include a spreadsheet of numbers and may include a title and sub-title that a user may edit through user interface 144. A "user interface," as used in this disclosure, is a means by which the user and a computer system interact, including the use of input devices and software. For example, a user may input into a user interface, social media platforms they have accounts on and would like to retrieve user data from. A user interface may include a graphical user interface (GUI), command line interface (CLI), menu-driven user interface, touch user interface, voice user interface (VUI), form-based user interface, and the like. In an embodiment, user interface 144 may comprise a speaker and/or microphone. In an embodiment, user interface 144 may include a display (such as a light emitting diode (LED) display, liquid crystal, quantum dot LED (QLED), organic LED (OLED), active-matrix organic LED (AMOLED), Super AMOLED, and the like), touch screen, or digital writing device. User interface 144 may comprise one or more means for receiving user input such as a keypad, keyboard, mouse, button, touchscreen (including shapes, icons, objects, images, prompts, colors, and the like displayed on a touchscreen which indicate a user intention or selection when touched), touchpad, knob, dial, slider, switch, or the like. User interface 144 may comprise one or more means for providing output such as a display, screen, speaker, vibrating motor (such as the type for vibrating smartphones), LED, light, buzzer, alarm, or the like. A user may select an individual cell or entire rows and/or columns to apply formatting or conditional formatting options. A user interface 144 may include a chatbot to facilitate the understanding and interpretation of the ledger data 132 analyzed by apparatus 100. A user interface 144 may be compatible with publicly available software collaboration tools.

With continued reference to FIG. 1, a spreadsheet included in ledger file 128 may contain one or more cells. A "cell" as used herein is an element of a spreadsheet. The ledger file 128 may include notes or notations, user comments, and the like. The ledger file 128 may include a tab containing information in graphical or picture format, such as a tab with one or more graphs. A tab of ledger file 128 may include a visualization or model. In an embodiment, a tab may have statistical calculations based on a first tab, such as mean, median, mode, standard deviation, and similar statistical calculations of values contained in the first tab. A user may edit data in a first tab through user interface 144 and processor 108 may automatically update any ledger data 132 in other tabs related to or associated with the edited data. In an embodiment, a plurality of tabs may contain different predictions related to ledger data 132 in a first tab based on various assumptions or changes to the ledger data 132 in the first tab. In an additional embodiment, a user may add a comparison tab using the user interface 144 that may prepopulate with data from another tab and shows a side-by-side comparison of at least two portions of ledger data 132 with an indication of a difference between the at least two portions. The user may show or hide data columns as desired using user interface 144 including data columns from other tabs or other ledger files entirely.

With continued reference to FIG. 1, processor 108 may be further configured to classify a ledger file 128 to a ledger type 136 using machine learning. For example, processor 108, machine learning module 116, or another device may receive or generate ledger classification training data associating exemplary ledger data with ledger types. "Training data," as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, by labeling of a given element of data by a user as pertaining to a given ledger type, or the like.

Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

With continued reference to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by processor 108, machine learning module 116, and/or another device may correlate any input data as described in this disclosure to any output data as described in this disclosure. For example, processor 108 may classify a ledger file 128 to a ledger type 136 using machine learning by first creating or receiving ledger classification training data. Ledger classification training data may correlate ledger data 132 within a ledger file 128 to a particular class of ledger. For example, ledger classification training data may correlate ledger data corresponding to percentage monthly return on investment to an investment ledger classification type.

With continued reference to FIG. 1, a classifier may be configured to output at least a datum that labels or otherwise identifies a set of data that are clustered together, found to be close under a distance metric such as a norm, or the like. Machine-learning module 116 may generate a classifier using a classification algorithm, defined as a process whereby a computing device and/or any module and/or component operating thereon derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, processor 108, machine learning module 116, or another device may classify elements of ledger classification training data into different ledger types such as an investment ledger, a life insurance ledger, a monthly premium ledger, a payout ledger, and the like. Processor 108, machine learning module 116, or another device may further classify sub-types such as sub-categories of payout ledger, such as cash value, surrender value, accumulation value, death benefit, and the like. Processor 108, machine learning module 116, or another device may be programed by instructions contained on memory 112 to classify elements of training data based on similarity of values (e.g. a variance below a threshold, standard deviation below a threshold, difference between maximum and minimum values below a threshold), an existing labeling within the data (for instance the data may be labeled by a human, or may be labeled by processor 108, or may be labeled by another device or process), or any suitable selection criteria. Processor 108 may retrieve data corresponding to ledger classification and existing improvements to ledger classification from storage 120, memory 112, machine learning module 116, or any suitable storage source.

With continued reference to FIG. 1, processor 108 may be configured to generate a classifier using a Naive Bayes classification algorithm. Naive Bayes classification algorithm generates classifiers by assigning class labels to problem instances, represented as vectors of element values. Class labels are drawn from a finite set. Naive Bayes classification algorithm may include generating a family of algorithms that assume that the value of a particular element is independent of the value of any other element, given a class variable. Naive Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naive Bayes algorithm may be generated by first transforming training data into a frequency table. Processor 108 may then calculate a likelihood table by calculating probabilities of different data entries and classification labels. Processor 108 may utilize a naive Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naive Bayes classification algorithm may include a Bernoulli model that may be utilized when vectors are binary.

With continued reference to FIG. 1, processor 108 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 may be further configured to train a ledger classification machine learning model using the ledger classification training data. In a non-limiting embodiment, ledger classification training data is submitted to a machine-learning model, which generates a trained ledger classification machine learning model based on the correlated relationship or relationships. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from the ledger classification training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired ledger classification values at the output nodes. This process is sometimes referred to as deep learning.

With continued reference to FIG. 1, processor 108 may be configured to utilize a trained ledger classification machine learning model to generate a ledger classification. For example, a trained ledger classification machine learning model may receive all of or a portion of ledger file 128, or ledger data 132, as an input. The ledger classification machine learning model may then output a ledger file classification based on the data types, the organization of data within the ledger file 128, and the correlations indicated in the ledger classification training data. For example, a ledger file 128 may contain a graph of data points containing an X and Y axis where the X axis is labeled "monthly premium payments". Ledger classification machine learning model may receive the labeled data after having been trained to recognize the word "premium" in the X axis label and classify the ledger file 128 as a premium payment ledger file. In an additional or alternative example, ledger classification machine learning model may receive a ledger file 128 containing three separate portions. A ledger classification machine learning model may correlate the number of separate portions with a particular ledger file classification and may output the corresponding ledger file classification. In an additional or alternative example, a ledger classification machine learning model may be updated using each ledger file it classifies. For example, a ledger file 128 may be classified according to user and the machine learning model updated so that future ledger files have a continually corpus of ledger files to use for classification. Outputs may include any of the above listed types of ledger files including insurance ledger files, premium ledger files, cash value ledger files, cash surrender value ledger files, accumulation value ledger files, death benefit ledger files, loan amount ledger files, policy distribution ledger files, investment return ledger files, health insurance ledger files, home insurance ledger files, auto insurance ledger files, life insurance ledger files, boat insurance ledger files, recreational vehicle (RV) insurance files, and the like.

With continued reference to FIG. 1, processor 108 may be further configured to classify a ledger file 128 based on a user or user type. For example, a ledger file 128 may include a customer name. Memory 112 may contain instructions configuring processor 108 to scan the ledger file 128 and extract the user name. Processor 108 may be further configured to compare the user name with informational contents 124 of storage 120 containing user names and their associated ledger file types by receiving the user name from storage 120. Processor 108 may then classify the ledger file according to the indicated ledger file type. In an alternative embodiment, processor 108 may utilize a ledger classification machine learning model trained on user data to classify the ledger file 128. For example, ledger classification machine learning model may be trained using ledger classification training data correlating user parameters such as age, occupation, location, health history, and the like to ledger file classifications. Processor 108 may accordingly classify a ledger file 128 by inputting one or more user parameters extracted from a ledger file 128 to the trained ledger classification machine learning model and receive as output a ledger file classification based on the one or more user parameters.

With continued reference to FIG. 1, processor 108 may be further configured to classify ledger file 128 based on a pecuniary parameter. "Pecuniary parameter," as used herein, is defined as an element of information related to money. In an embodiment, a pecuniary parameter may be a monthly premium payment, a monthly or annual return on investment, a death benefit, a distribution amount, a cash value amount, a cash surrender amount, and the like. For example, memory 112 may contain instructions configuring processor 108 to extract a data label from ledger file 128 or ledger data 132 by receiving ledger data 132 and comparing received data with a label keyword such as "premium". The keywords used by processor 108 may be linked to a defined ledger class, for example by a person manually associating keywords with a defined ledger class or by a computing device such as computing device 104 programmed to create an association between a keyword and a defined ledger class, for instance by extracting words contained in ledger data 132. In the above example, processor 108 may identify the keywords "death" and "benefit" and classify the ledger file 128 based on the association between those keywords and the ledger class. In an embodiment, the pecuniary parameter may correspond to (e.g. be related to, linked to, or associated with) both an investment parameter and an insurance parameter. "Investment parameter," as used herein, is defined as an element of information related to an investment. "Insurance parameter," as used herein, is defined as an element of information related to insurance. For example, the pecuniary parameter used to classify ledger file 128 may be a distribution amount when a user associated with the ledger file 128 reaches 65 years of age. Such a distribution amount may correspond to an investment of life insurance policy monthly premia and thereby be linked to an investment parameter of total invested amount (e.g. because processor 108 may be configured by instructions contained on memory 112 determine that distribution amount may not exceed total invested amount) and an insurance parameter of monthly premium (e.g. because processor 108 may be configured by instructions contained on memory 112 to determine distribution amount scales linearly with deposited monthly premium).

With continued reference to FIG. 1, processor 108 is further configured to analyze the ledger file 128 to identify one or more trends in the ledger data 132. A "trend" as used herein is defined as an identifiable tendency in a plurality of data elements. For example, if given five data elements with values of 5, 6, 7, 8, and 9, in that order, the data elements could be described as having a linear increasing trend; each successive data element is one higher than the previous data element. Memory 112 may configure processor 108 to identify one or more trends in the ledger data 132 using a curve fitting process such as least squares regression, polynomial regression, polynomial interpolation, and/or splining to determine a curve such as a linear or exponential curve that best fits the data. Processor 108 may use a gradient descent algorithm to determine a curve to fit to ledger data 132. For example, a gradient descent algorithm used by processor 108 to determine a curve to fit to ledger data 132 may include a stochastic gradient descent algorithm, which may include a method that iteratively optimizes an objective function, such as an objective function representing a statistical estimation of relationships between terms, including relationships between input terms and output terms, in the form of a sum of relationships to be estimated. Ledger data 132 may be organized such that each data element has a specified order and the least squares regression process that memory 112 may configure processor 108 to use may order the data according to the specified order. For example, elements of ledger data 132 may be indexed. Identified trends may include a linear trend, a parabolic trend, an exponential trend, and the like. Identified trends may have associated curves; for example, a parabolic trend may be best fit by an associated parabolic curve. Processor 108 may be further configured to identify one or more locations of the trend where the trend "breaks down;" in other words where the least squares fit between data points and a fitted curve becomes higher than a threshold.

With continued reference to FIG. 1, processor 108 may be further configured to segment the ledger data 132 into one or more trend segments based on the identified one or more trends. A "trend segment" as used herein is defined as a segment of ledger data 132 that corresponds to a trend. For example, a trend segment may include all data points within a defined threshold least squares distance from a trendline. Memory 112 may configure processor 108 with a defined threshold, or processor 108 may be configured by memory 112 to determine a threshold based on a percentage of each data element value (e.g. a least squares distance between a trendline and a data element must be within ±5% of the data element value), or the like. In an additional or alternative embodiment, processor 108 may be configured to segment the ledger data 132 into one or more trend segments based on an indication in ledger data 132 indicating where ledger data 132 should be segmented. For example, ledger data 132 may contain labeled data indicating two index numbers defining the start and end of a segment. Ledger data 132 may contain a specified number of segments, or memory 112 may contain instructions configuring processor 108 to identify index numbers defining specified segments, for example by using a regression analysis as described herein. The identified index numbers may correspond to locations where all data element values between two index numbers are within a threshold least squares distance of a trend line. Processor 108 may be configured by instructions on memory 112 to determine coefficients for curve fitting methods such as splining or polynomial regression iteratively or recursively, for example by using an algorithm such as a gradient descent algorithm. For example, processor 108 may determine coefficients for a fitted trendline by utilizing an iterative optimization algorithm such as gradient descent that uses the differential of the trendline function to find the fastest decrease in the gradient. This process may be iterated until a desired local minimum is reached, which corresponds to coefficients for an optimally fitted trendline for the ledger data 132. Processor 108 may then use these coefficients to generate a trendline such as a segment or predictive trendline outlined below. Processor 108 may further store the determined coefficients in immutable sequential listing 148 in accordance with the below description.

With continued reference to FIG. 1, the processor 108 may be configured to segment the ledger data 132 into one or more trend segments by identifying one or more external events influencing the ledger data 132. For example, ledger data 132 may contain a label indicating an index number or index numbers indicating data that has been affected by an external event such as a distribution, a health event resulting in an increase in monthly premium, or the like. Ledger data 132 may have an expected profile and identifying the one or more external events and segmenting the ledger data 132 into one or more segments based on the identified external events may include determining that a trendline fitted to ledger data 132 fails to follow the expected profile after a certain index value, between two index values, or until a certain index value. A determination that a trendline fails to follow an expected profile may include a determination that a least squares distance between a data element and a trendline exceeds a predefined threshold (for instance predefined as programmed in instructions stored on memory 112). In an alternative embodiment, ledger file 128 may indicate external events by providing data already separated into tabs or other delineators within the ledger file 128. As used herein, a "delineator" is a data element indicating a separation of data. For example, a first tab may indicate a segment of data from before a user had a health episode (such as a heart attack), a second tab may indicate a segment of data from during the user's health episode, and the third tab may indicate a segment of data from after the user's health episode. Memory 112 may configure processor 108 to treat tabs as delineators automatically and thereby segment data associated with each tab. In an alternative embodiment, processor 108 may be configured by instructions contained on memory 112 to identify the slope of a trendline at each data element. Processor 108 may further identify an external event based on a sudden increase or decrease in trendline slope. For example, processor 108 may determine the slope at a given index location by determining the slope between index $i_{x-1}$, $i_x$, and $i_{x+i}$. For example, processor 108 may take the average of $(i_x-i_{x-1})$ and $(i_x-i_{x+1})$ to determine the effective slope at $i_x$. Processor 108 may repeat this for each data point as applicable (not counting the endpoints) and may define an external event as data points on either side of or between indices where the slope changes more than a threshold amount. Processor 108 may change the data in a delineated column and the data depending from the delineated column may change according to a relationship specified in the ledger data 132. This can work in either direction. For example, processor 108 may change cash surrender value which would cause accumulation values to change, or may change accumulation values and cash surrender values change. In contrast, a dependency may be a one-way dependency. For example, processor 108 may be configured to change or receive indication of a user change through user interface 144 of ledger data 132 in an editable column, which may result in ledger data 132 in a dependent data column changing. However, changing the dependent column may not result in the editable column changing. For example, increasing premium may increase cash value, but increases in cash value from good investment performance may not correspondingly increase premiums. Independent and dependent data may be specified based on instructions contained on memory 112 or by user input received from user interface 144. For example, changing the dependent data related to death benefit will not change independent data related to the cash value or premium, but changing the cash value or premium will change the death benefit.

With continued reference to FIG. 1, processor 108 may be configured to segment the ledger data 132 by removing data indicative of an external event. For example, processor 108 may be configured to determine one or more segments corresponding to an external event as outlined above, and in response to the determination, remove the data corresponding to the external event segments such as sudden upturns or downturns of the ledger data 132. Processor 108 may then be configured by instructions contained on memory 112 to perform an interpolation process as is known in the art, rejoin or splice the remaining segments, or fill in the removed data with smoothed data. Processor 108 may then generate a new trendline fitting the remaining data once the data associated with the external event has been removed. Rejoining or splicing the remaining segments may be performed by processor 108 as a function of the number of data elements removed in association with an external event. For example, processor 108 may be configured by instructions contained on memory 112 to segment the ledger data 132 and generate a trendline when the number of removed data elements associated with an external event are below a threshold number or percentage of the data, or when the change in slope between the data before the event and the data after the event is below a threshold.

With continued reference to FIG. 1, processor 108 may be further configured to minimize an effect of the one or more external events on the ledger data 132. As used herein, "minimize an effect" is defined as reducing a least squares difference between at least one data element of ledger data 132 and a trendline after the ledger data 132 has been altered compared to the same trendline prior to alteration of the ledger data 132. For example, processor 108 may receive ledger data 132 and generate a trendline minimizing the least squares regression. Processor 108 may identify that the data has been affected by an external event and may be configured by instructions stored in memory 112 to determine that the effect of the external event should be minimized. In response to the determination, processor 108 may remove the ledger data 132 associated with the external event, may smooth the ledger data 132 associated with the external event (for instance by replacing the external event data with an average of the affected values, by interpolating the non-event data indexed adjacent to the external event data, or the like), or the like. Once the higher variance external event data has been smoothed or removed, processor 108 may generate a second trendline for the smoothed ledger data 132, for example using techniques described above. In smoothing or removing the external event data, processor 108 may be configured to reduce the variance in the overall data with respect to the least squares distance of the adapted ledger data 132, thus minimizing the overall effect of the external event.

With continued reference to FIG. 1, the processor 108 may be configured to fit one or more segment trendlines to each of the one or more trend segments. A "segment trendline" as used herein is defined as a trendline fitted to a determined segment. For example, processor 108 may be configured to determine segments based on their location in a tab of a ledger file 128. In an alternative embodiment, ledger file 128 may contain labeled data indicating indices corresponding to the start and end values of one or more segments. Processor 108 may determine segments in any suitable way, including those methods outlined above. Processor 108 may be configured to fit an individual trendline for each segment identified in ledger data 132. Exemplary trendlines determined by processor 108 include linear, exponential, parabolic, polynomial, power, moving average, or any suitable trendline. Ledger data 132 being fit may include data related to surrender values, accumulation values, income, death benefit, premium, cash surrender value, loan amounts, policy distributions, return on investment, and the like.

With continued reference to FIG. 1, processor 108 may be configured to fit one or more segment trendlines to each of the one or more trend segments using machine learning. For example, processor 108, machine learning module 116, or another device may receive or generate trendline fit training data correlating exemplary ledger data or ledger data parameters with exemplary fitted trendlines. "Ledger data parameters," as used herein, are defined as one or more elements of ledger data describing, defining, or included in the ledger data. In an additional or alternative embodiment, trendline fit training data may correlate patterns of segments, such as trendline fit training data that may correlate exemplary ledger data with data segments that match a whole data set when taken together in a specified order. For example, ledger data 132 may include a first section of linear data and a second section of exponential data. Trendline fit training data may correlate a ledger data parameter such as age group with a data pattern or data segment pattern, such as expected policy cash value for a user aged 65 or older being correlated with an exponential growth segment followed by a sudden drop in value segment, e.g. the user pays into the policy throughout their working lives and the policy grows in investment value (constituting the exponential growth), then takes a distribution from the policy when they reach retirement age at 65 (constituting the sudden drop in value segment).

With continued reference to FIG. 1, processor 108 may be configured to generate one or more additional homogeneous segment trendlines, which may then optionally be used to train a trendline fit machine learning model. In an embodiment, processor 108 may receive ledger data 132 containing a dataset such as monthly cash value for a 20 year old policy (which would have 240 data points). In the event that processor 108 has not received more than a threshold number of similarly classified datasets (for example, 100 similarly classified datasets), the processor 108 may not be able to generate a trendline of sufficiently accurate fit based on previously received ledger data. To address this, processor 108 may create one or more data clones of ledger data 132 by propagating a segment trendline generated from ledger data 132 using a plurality of corresponding coefficients. In an embodiment, processor 108 is configured by instructions contained on memory 112 to generate additional segment trendlines by multiplying the segment trendline generated from ledger data 132 by each coefficient. In an embodiment, memory 112 may contain instructions with a predetermined number of coefficients, for example 100 coefficients starting with 1.01 and increasing by 0.01 up to 2.00. Processor 108 may then multiply each trendline by the coefficient (in other words, multiplying each data point element defining a segment trendline or trendline formula dependent variable) in order to create a set of 100 trendlines. In an embodiment, processor 108 may then apply this uniform set of segment trendlines to train a trendline fit machine learning model. In an embodiment, a suitable coefficient may be between 0.5 and 1.5, 1.0 and 2.0, 0.01 and 100, or any suitable range. In an embodiment, the number of coefficients may be 2 or more, 10 or more, 100 or more, 200 or more, 300 or more, 400 or more, 500 or more, 1000 or more, or any suitable number.

With continued reference to FIG. 1, processor 108 may be further configured to train a trendline fit machine learning model once trendline fit training data is generated or received. In a non-limiting embodiment, trendline fit training data is submitted to a machine-learning model, which generates a trained ledger classification machine learning model based on the correlated relationship or relationships. For instance, and without limitation, a linear regression model, generated using a linear regression algorithm, may compute a linear combination of input data using coefficients derived during machine-learning processes to calculate an output datum. As a further non-limiting example, a trendline fit machine-learning model may be generated by creating an artificial neural network, such as a convolutional neural network comprising an input layer of nodes, one or more intermediate layers, and an output layer of nodes. Connections between nodes may be created via the process of "training" the network, in which elements from the trendline fit training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired segment trendline values at the output nodes. This process is sometimes referred to as deep learning. In an embodiment, processor 108 may be further configured to update trendline fit training data with ledger data 132 received from or relating to a user and retrain the trendline fit machine learning model with the updated trendline fit training data such that the trendline fit machine learning model is regularly updated.

With continued reference to FIG. 1, once trained, processor 108 may be configured to utilize a trained trendline fit machine learning model to generate one or more trendlines. In an embodiment, processor 108 may be configured to output one or more segment trendlines by inputting trend segments into the trained trendline fit machine learning model and receiving the one or more segment trendlines as outputs from the trained trendline fit machine learning model. The segment trendlines may be applied to the ledger data 132 and displayed to a user or stored via storage 120 or on a immutable sequential listing as described below. The segment trendlines may include labels, such as a text label indicating what kind of curve has been fit (e.g. a label indicating that the curve is an exponential curve), what class of data the fitted portion of ledger data 132 represents (e.g. a label indicating that the data is insurance premium data, the data is a cash surrender value, the data is retirement income, etc.). A "label" as used herein, is defined as an indication of information regarding a trendline in a visual format. The processor 108 may be further configured to display predictions based on one or more predictive trendlines, such as those outlined below. A prediction may be a visual or audio indication of a future value related to ledger data 132. For example, a prediction may include a predictive value (e.g. an indication of a future distribution amount, a predicted future investment amount, a projected future monthly premium, a projected cash surrender value, a projected loan amount, and the like) and/or a date associated with a prediction (e.g. a date of retirement, a date of disbursal of investment, a date of policy termination, a date of predicted investment value, and the like). Processor 108 may be configured by instructions stored on memory 112 to display both a predictive value and a date at which a predictive value occurs, such as a predicted retirement date and a predicted retirement distribution amount. A trendline fit machine learning model may receive a collection of data such as ledger data 132 and may determine the best fitting type of trendline as well as the trendline parameters such as trendline equation, trendline slope (for a linear curve), trendline exponents (for a power or exponential curve), and the like, based on the correlations identified in the trendline fit training data.

With continued reference to FIG. 1, processor 108 may be further configured to generate at least one predictive trendline based on the segment trendlines. A "predictive trendline" as used herein is defined as a trendline used to indicate, predict, or otherwise inform future data. For example, processor 108 may use an extrapolation technique such as linear extrapolation, exponential extrapolation, power law extrapolation, parabolic extrapolation, and the like. A type of extrapolation may be determined based on the trendline fit for the selected segment. For example, if a predictive trendline is to be generated based on a segment indicating cumulative value of deposited premium, a segment trendline fitted to the data may be linear if the monthly premium is constant. Processor 108 may be configured to perform an extrapolation of the trendline, which would be a linear extrapolation since the corresponding trendline segment being extrapolated is linear. This would generate a predictive trendline indicating that the cumulative value of deposited premium should grow linearly and provide a user with related information of what a future value of their life insurance policy might be worth after a selected period of time such as five years. Ledger data 132 for which at least one predictive trendline is generated by processor 108 may include data related to surrender values, accumulation values, income, death benefit, premium, cash surrender value, loan amounts, policy distributions, return on investment, and the like.

With continued reference to FIG. 1, processor 108 may be further configured to optimize the at least one predictive trendline based on input received from a user through a user interface. "Optimize" as used herein is defined as improved, designed for a particular purpose, maximizing a desired characteristic, or tending to improve a desired characteristic. For example, a predictive trendline may be generated using a predictive trendline machine learning model using the techniques described above with respect to generating a trendline using machine learning. A user interface may include one or more inputs as outlined above, including, for example, an icon labeled "Apply AI." A user may press the "Apply AI" button or otherwise input instructions to the processor 108 to optimize the at least one predictive trendline for ledger data 132. For example the Apply AI button may instruct the processor 108 to determine additional trendline fit training data had become available since the last time the trendline fit machine learning model was trained, generate new trendline fit training data incorporating the additional trendline fit training data, train a trendline fit machine learning model, and input the ledger data 132 into the updated trendline fit machine learning model and receive an optimized trendline fit as an output. This functionality may provide a user with instant feedback and projections after uploading ledger data 132 based on premium, cash surrender value, accumulation value, death benefit, loan amounts, distribution from the policy, and other pecuniary data. Processor 108 may further display one or more indications of changes made to one or more predictive trendlines based on the input received from a user. For example, processor 108 may display a first predictive trendline in a gray color to indicate that the first predictive trendline is not the newest and most updated trendline and may display a second predictive trendline in a bright green color to indicate that the second predictive trendline is the most up to date trendline. In an embodiment, processor 108 may display labels with some or all predictive trendlines. For example, processor 108 may display a text label indicating a second predictive trendline as "Updated Predictive Trendline," for example by displaying the aforementioned text inside a rectangular box with a leader line connecting the rectangular box and the predictive trendline. Processor 108 may display the indication adjacent to an end of one or more predictive trendlines such that the proximity of the indication to the predictive trendline informs the user which trendline the indication refers to.

With continued reference to FIG. 1, processor 108 is further configured to store the ledger file 128 to an immutable sequential listing 148. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Processor 108 may cryptographically hash ledger file 128 and store it on the immutable sequential listing 148. The immutable sequential listing 148 may be distributed or decentralized by storing multiple copies of the identical immutable sequential listing 148 in a plurality of storage locations. In an alternative embodiment, the immutable sequential listing 148 may be stored only in informational contents 124 of storage 120. Processor 108 may store ledger file 128 on immutable sequential listing 148 in order to increase confidence that the data stored thereon will be secure by cryptographically storing the ledger file 128 as well as optionally providing distributed storage.

With continued reference to FIG. 1, processor 108 may be configured to select one or more elements of ledger data 132 to store to the immutable sequential listing 148 based on the ledger type 136, the one or more trends, and/or the one or more labels or indications associated with trendlines. For example, ledger data 132 may include comparative data from a plurality of ledgers. The ledger file 128 may be accordingly classified as a comparative data ledger. Processor 108 may be configured by instructions contained on memory 112 to store only the elements of ledger data 132 original to the ledger file 128, i.e. not to store any elements of ledger data 132 that were added to ledger file 128 for comparative purposes. Processor 108 may be further configured to store ledger data 132 to the immutable sequential listing 148 if the ledger data 132 represents a predetermined type of information, such as premium, cash surrender value, accumulation value, death benefit, loan amounts, distribution from the policy, and other pecuniary data. Processor 108 may be further configured to select one or more elements of ledger data 132 based on a ledger type 136 associated with a user. For example, processor 108 may be configured to store one or more elements of the ledger data 132 to the immutable sequential listing 148 based on a determination that the user is over the age of 30, that the user has been with an insurance company for more than a predetermined length of time such as 2 years, or the like. In an additional or alternative embodiment, processor 108 may be configured to store a portion or all of ledger data 132 to immutable sequential listing 148 based on labels identifying the portion or all of ledger data 132 or labels identifying one or more fitted trendlines. For example, instructions contained on memory 112 may configure processor 108 to identify one or more labels associated with a portion or all of ledger data 132 and/or one or more segment and/or predictive trendlines associated with ledger data 132. Processor 108 may then be configured by instructions contained on memory 112 to match the one or more labels or elements of the labels (such as text within the labels, a label color associated by instructions contained on memory 112 with a category, a label shape associated by instructions contained on memory 112 with a category, or the like) to a ledger type. Upon such a determination of matching, processor 108 may be further configured to store some or all of ledger data 132 to immutable sequential listing 148.

Figure 2:
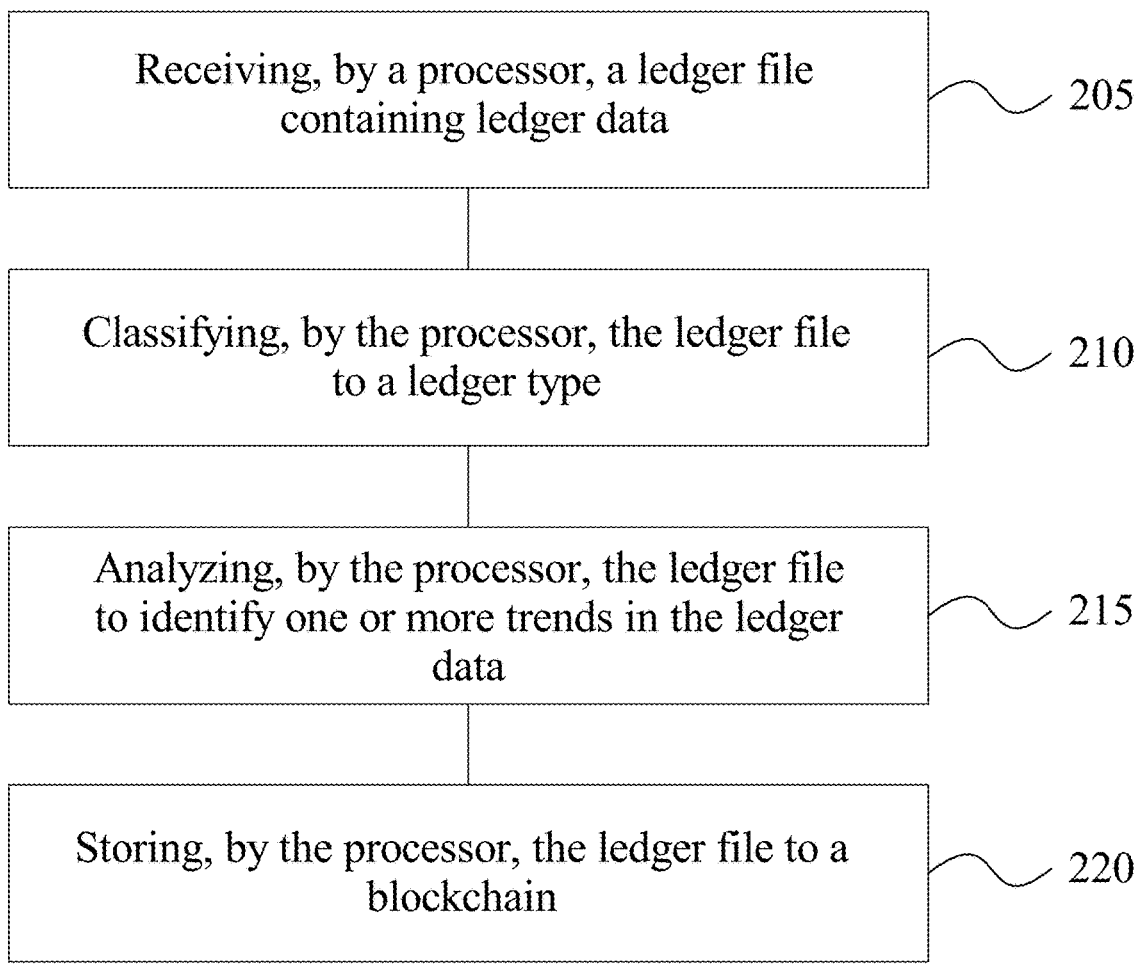
FIG. 2 illustrates particular implementations of various steps of a method for AI-based ledger prediction.

Referring now to FIG. 2, a method 200 for predictive ledger generation is described. Method 200 comprises the steps of: 205 receiving, by a processor, a ledger file containing ledger data; step 210 classifying, by the processor, the ledger file to a ledger type; step 215 analyzing, by the processor, the ledger file to identify one or more trends in the ledger data; and storing, by the processor, the ledger file to an immutable sequential listing.

Still referring to FIG. 2, step 205 comprises receiving, by a processor, a ledger file containing ledger data. This step may be performed in accordance with corresponding steps performed by apparatus 100 with respect to FIG. 1.

Still referring to FIG. 2, step 210 comprises classifying, by the processor, the ledger file to a ledger type. This step may be performed in accordance with corresponding steps performed by apparatus 100 with respect to FIG. 1.

Still referring to FIG. 2, step 215 comprises analyzing, by the processor, the ledger file to identify one or more trends in the ledger data. This step may be performed in accordance with corresponding steps performed by apparatus 100 with respect to FIG. 1.

Still referring to FIG. 2, step 220 storing, by the processor, the ledger file to an immutable sequential listing. This step may be performed in accordance with corresponding steps performed by apparatus 100 with respect to FIG. 1.

Figure 3:
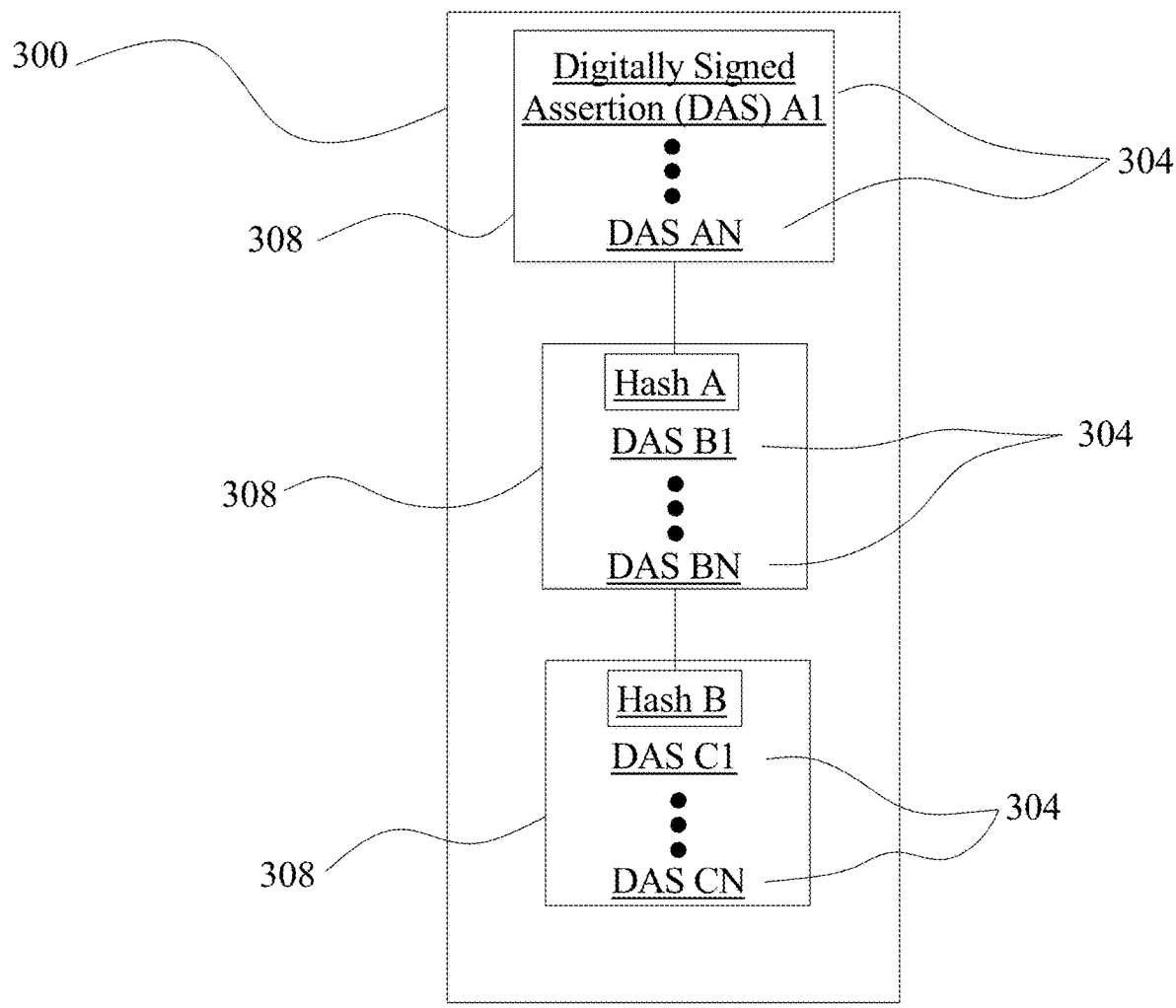
FIG. 3 is a diagram of an immutable sequential listing according to an embodiment of the invention.

Referring now to FIG. 3, an exemplary embodiment of an immutable sequential listing 300 is illustrated. Data elements are listing in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3, immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Figure 4:
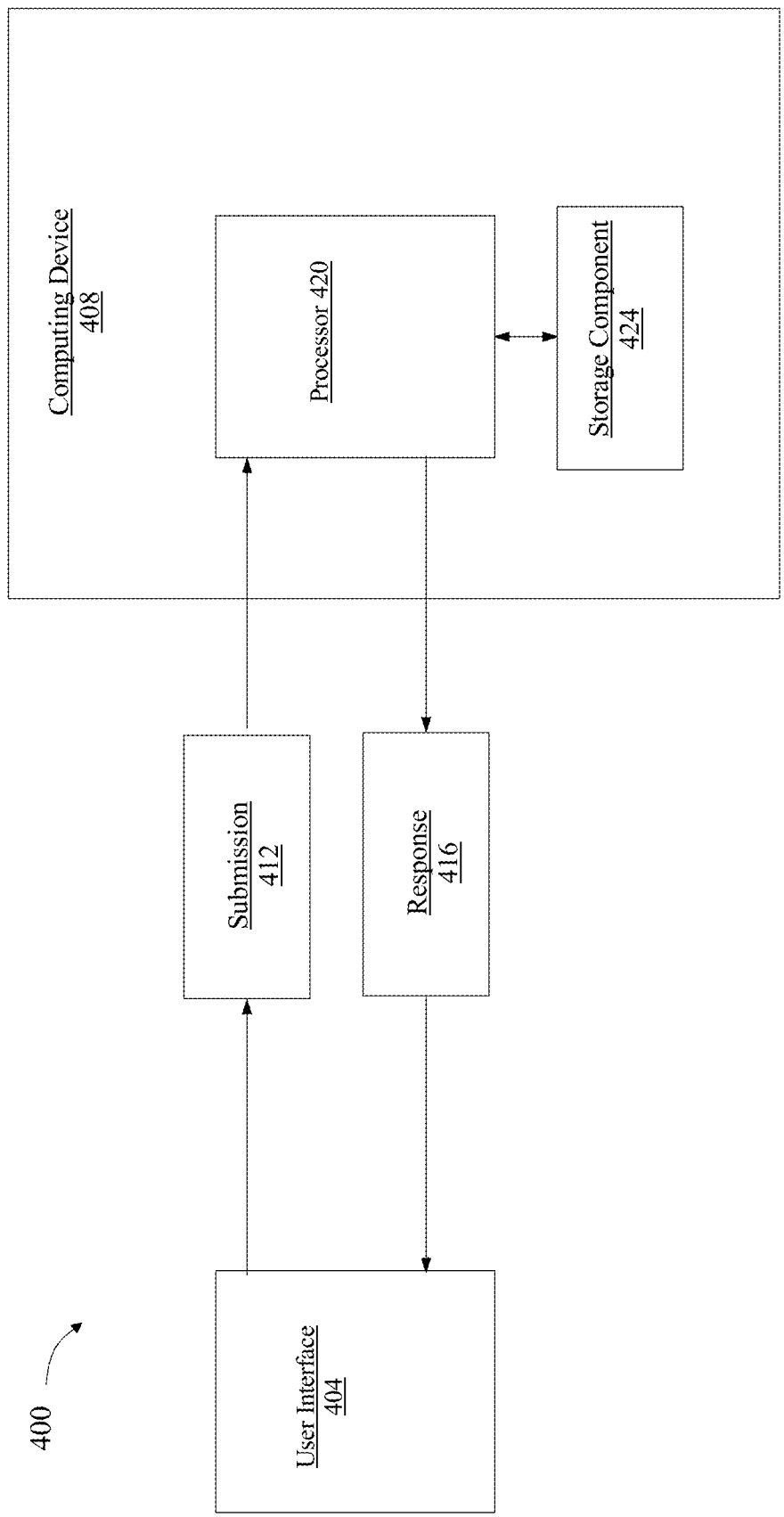
FIG. 4 is a block diagram of a chatbot in accordance with an embodiment of the description.

Referring to FIG. 4, a chatbot system 400 is schematically illustrated. According to some embodiments, a user interface 404 may be communicative with a computing device 408 that is configured to operate a chatbot. In some cases, user interface 404 may be local to computing device 408. Alternatively or additionally, in some cases, user interface 404 may remote to computing device 408 and communicative with the computing device 408, by way of one or more networks, such as without limitation the internet. Alternatively or additionally, user interface 404 may communicate with user device 408 using telephonic devices and networks, such as without limitation fax machines, short message service (SMS), or multimedia message service (MMS). Commonly, user interface 404 communicates with computing device 408 using text-based communication, for example without limitation using a character encoding protocol, such as American Standard for Information Interchange (ASCII). Typically, a user interface 404 conversationally interfaces a chatbot, by way of at least a submission 412, from the user interface 408 to the chatbot, and a response 416, from the chatbot to the user interface 404. In many cases, one or both of submission 412 and response 416 are text-based communication. Alternatively or additionally, in some cases, one or both of submission 412 and response 416 are audio-based communication.

Continuing in reference to FIG. 4, a submission 412 once received by computing device 408 operating a chatbot, may be processed by a processor 420. In some embodiments, processor 420 processes a submission 412 using one or more of keyword recognition, pattern matching, and natural language processing. In some embodiments, processor employs real-time learning with evolutionary algorithms. In some cases, processor 420 may retrieve a pre-prepared response from at least a storage component 424, based upon submission 412. Alternatively or additionally, in some embodiments, processor 420 communicates a response 416 without first receiving a submission 412, thereby initiating conversation. In some cases, processor 420 communicates an inquiry to user interface 404; and the processor is configured to process an answer to the inquiry in a following submission 412 from the user interface 404. In some cases, an answer to an inquiry present within a submission 412 from a user device 404 may be used by computing device 104 as an input.

Figure 5:
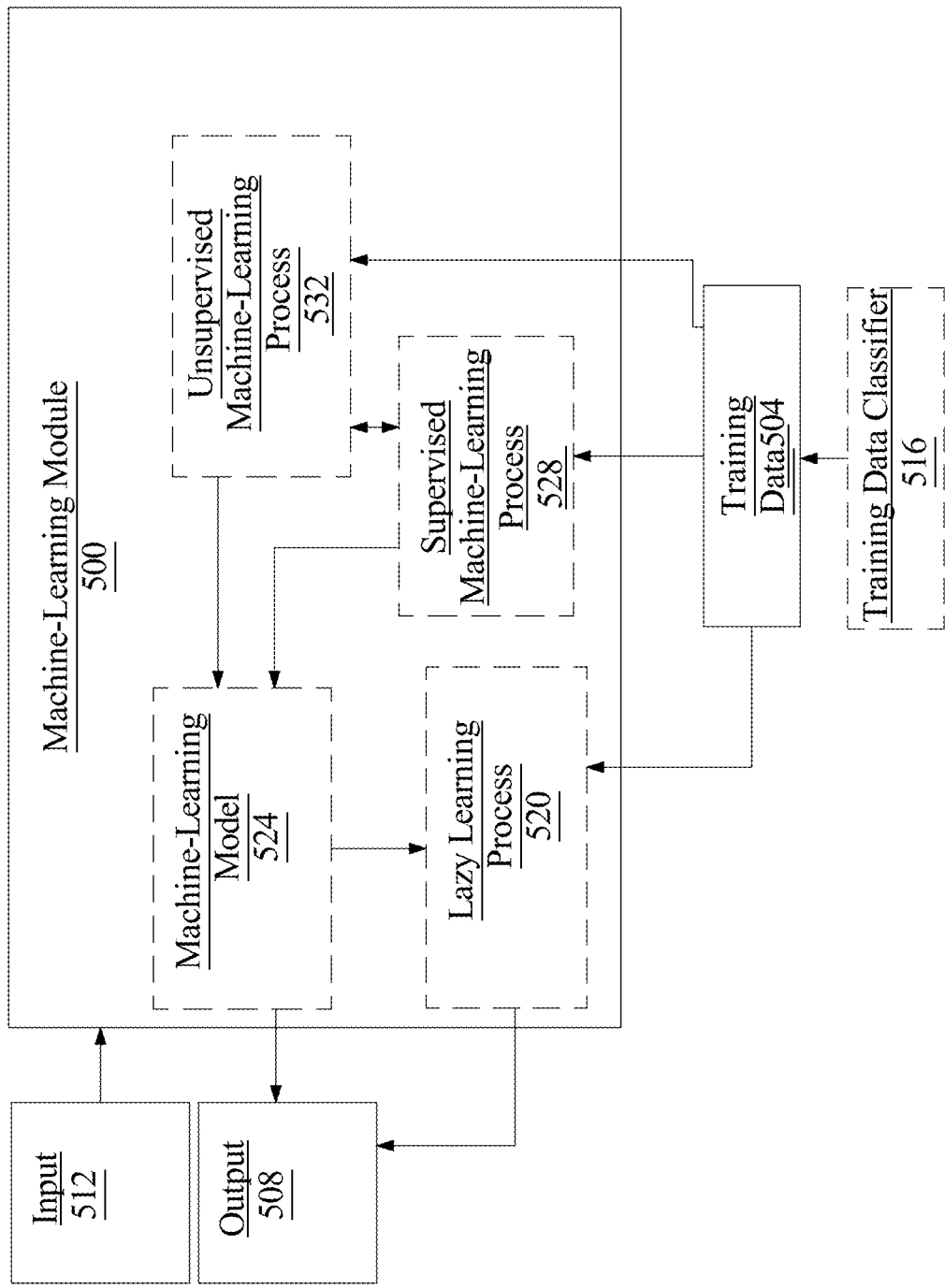
FIG. 5 is a diagram of a machine learning module in accordance with an embodiment of the description.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 412; this is in contrast to a non-machine learning software program where the commands to be executed are determined in advance by a user and written in a programming language.

Still referring to FIG. 5, training data 504 may be in accordance with training data with reference to FIG. 1.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 6:
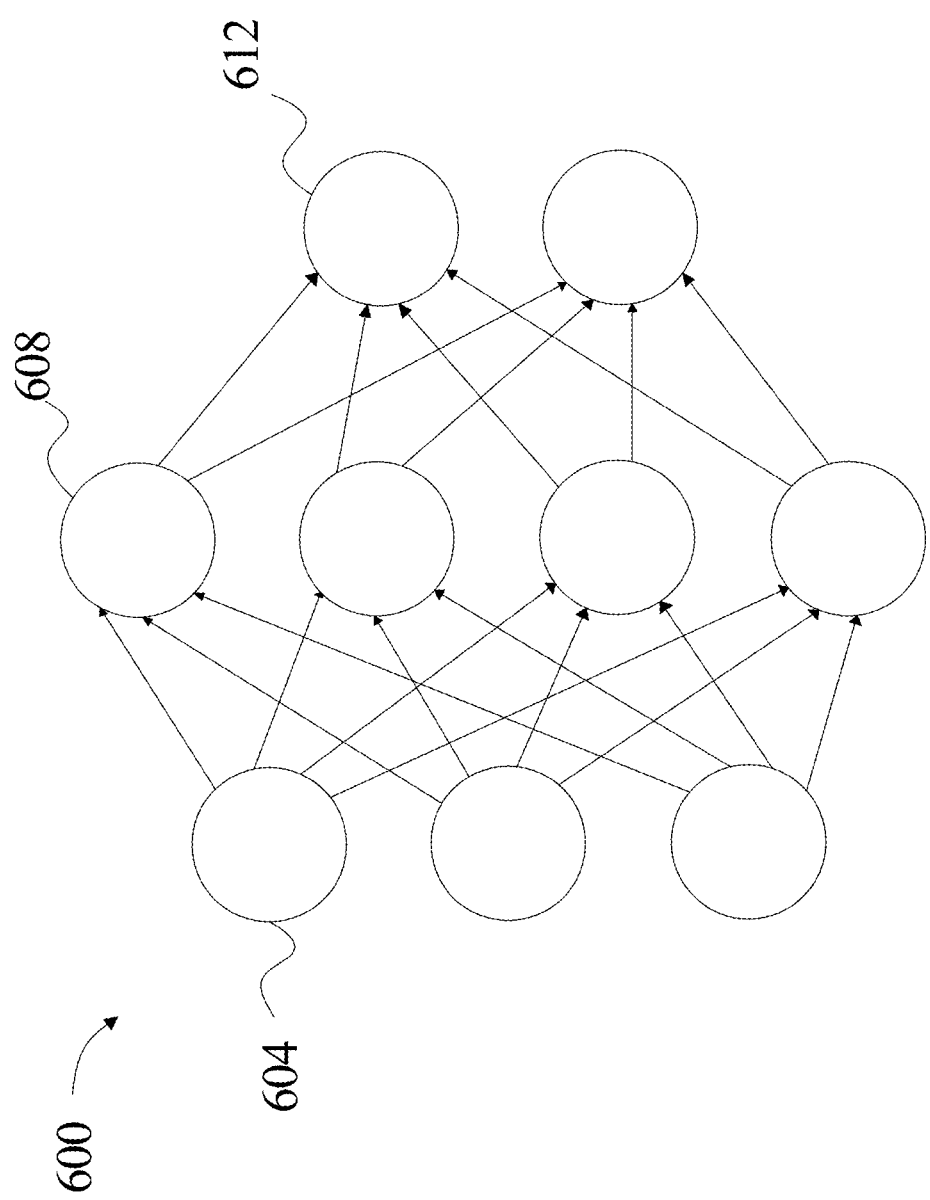
FIG. 6 is a diagram illustrating a neural network in accordance with an embodiment of the description.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
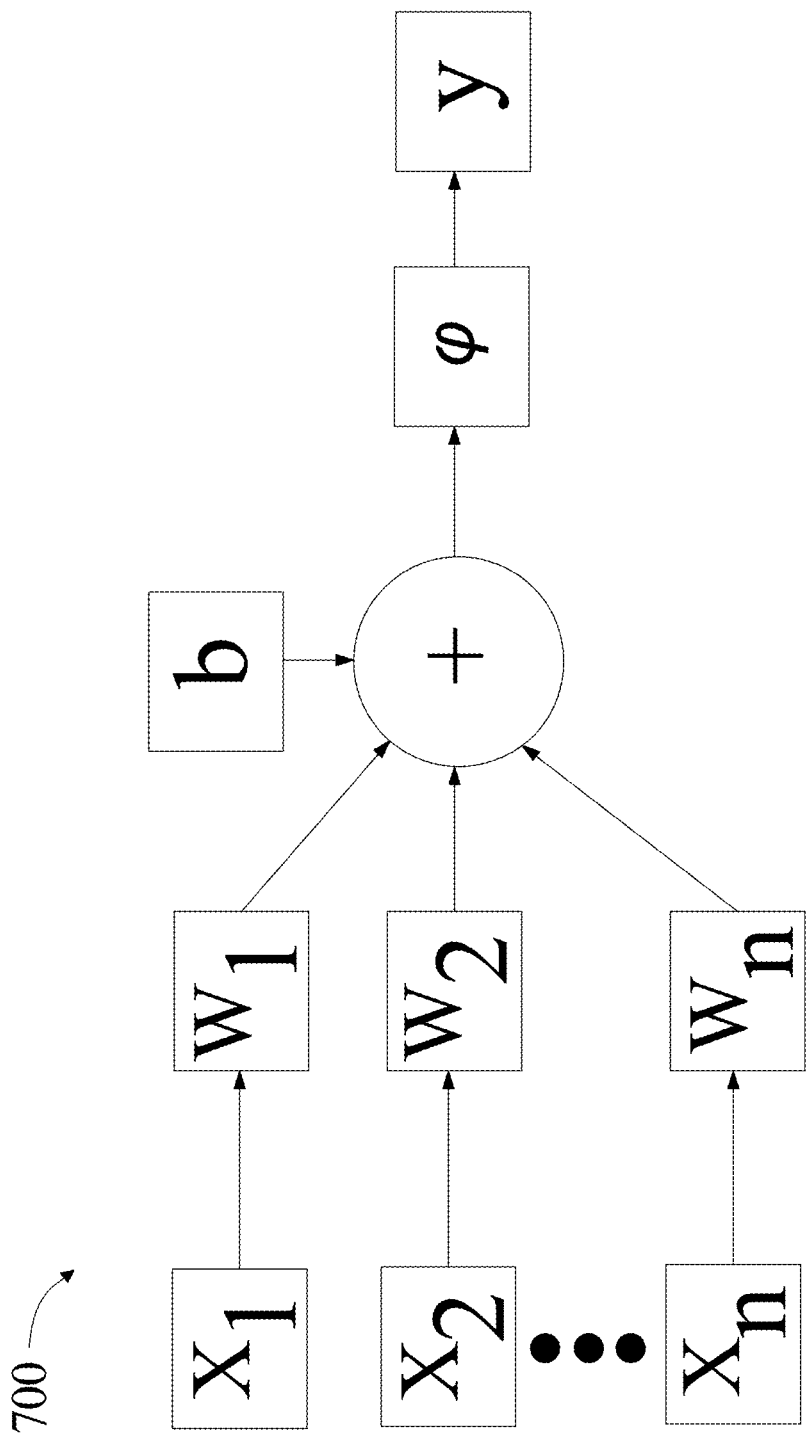
FIG. 7 is a diagram illustrating a node of a neural network in accordance with an embodiment of the description.

Referring now to FIG. 7, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic $$\frac{e^x - e^{-x}}{e^x + e^{-x}},$$

tangent) function, of the form a tanh derivative function such as f (x)=tanh$^2$(x), a rectified linear unit function such as f (x)=max (0, x), a "leaky" and/or "parametric" rectified linear unit function such as f (x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as f (x)=x * sigmoid(x), a Gaussian error linear unit function such as f(x)=a(1+tanh ($\sqrt{2/\pi}$(x+bx$^r$))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. As used herein, "module" may refer to a hardware module or a software module. A hardware module is any collection of hardware configured to perform at least a specified task. A software module, conversely, is any collection of software instructions configured to perform at least a specified task.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs, one or more hard disk drives in combination with a computer memory, a distributed storage system such as cloud storage, and the like. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. As used herein, "module" may refer to a hardware module or a software module. A hardware module is any collection of hardware configured to perform at least a specified task. A software module, conversely, is any collection of software instructions configured to perform at least a specified task.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs, one or more hard disk drives in combination with a computer memory, a distributed storage system such as cloud storage, and the like. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
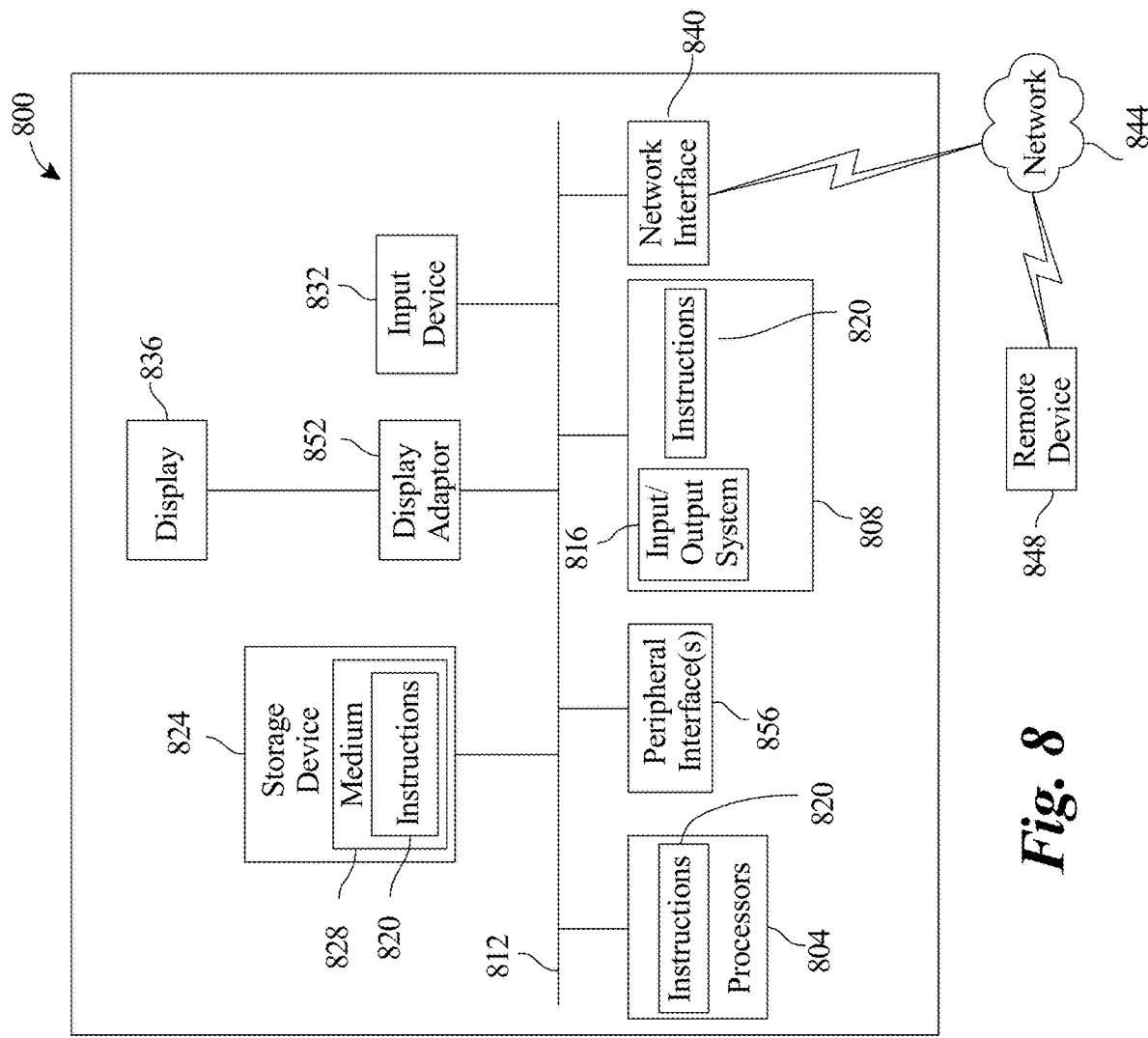
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Figure 9:
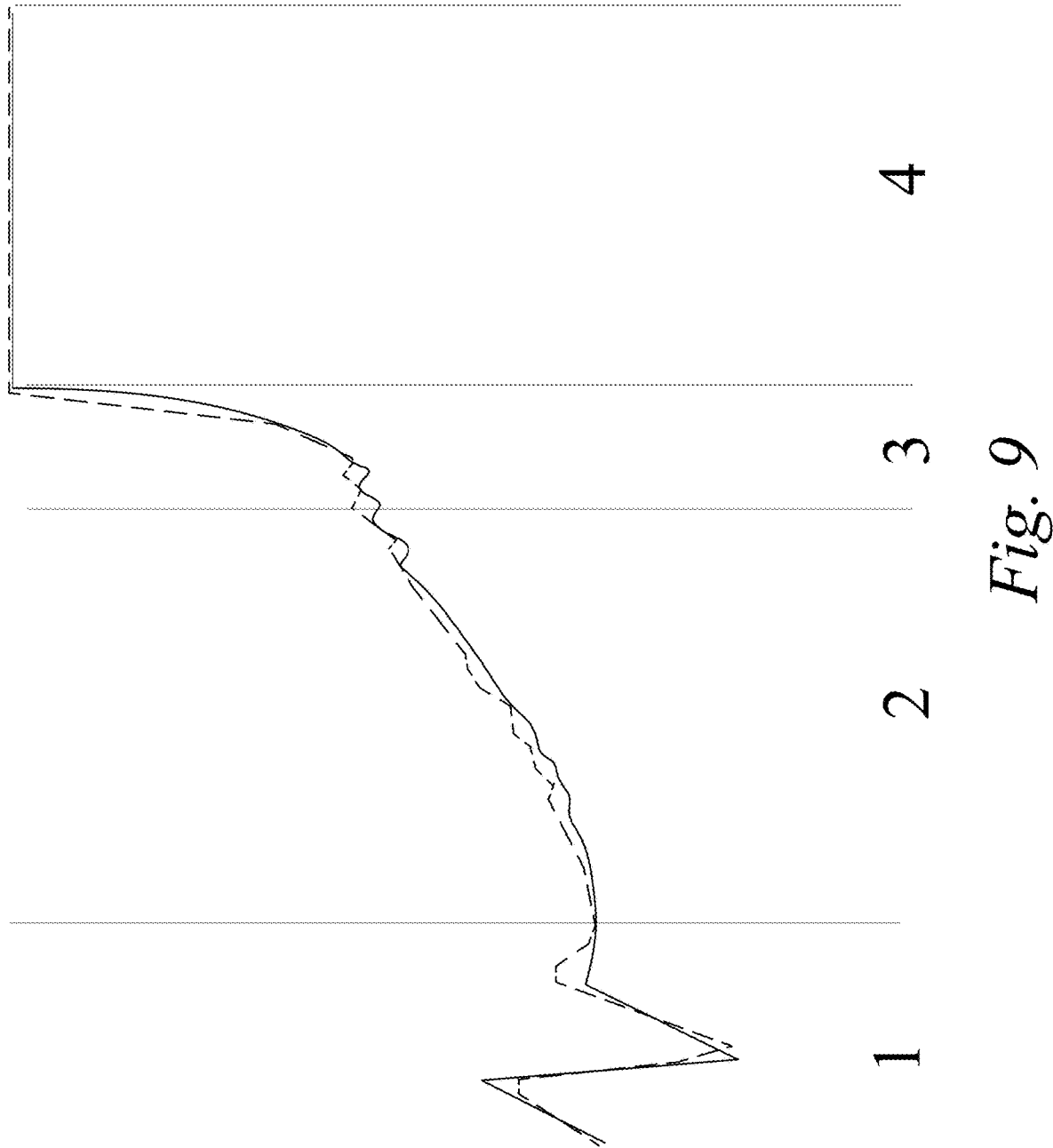
FIG. 9 is an illustration of a segmentation and trendline fit to ledger data in accordance with an embodiment.

Now referring to FIG. 9, an exemplary segmentation and trendline segment fit is illustrated. The ledger data 132 has been segmented based on segmentation methods described herein, and four distinct segments have been determined, labeled segments 1-4, which have been identified by processor 108. Based on the identified segmentations, processor 108 has fit four segment trendlines as illustrated by the dotted lines. The figure illustrates cumulative premium paid into a life insurance policy. Segment 1 is a segment affected by an external event and is therefore noisy and somewhat random, for example a customer was young and paid into a policy irregularly and somewhat impulsively withdrew money from the policy twice, decreasing its value. Segment 2 shows a mild exponential growth as the user consistently paid in premiums and the premiums increased slightly with age. Segment 3 illustrates more drastic exponential growth due to a greatly increased risk of death due to old age. In segment 4, the user has died and no longer pays premiums into the life insurance policy.

If not sufficiently clear from contextual or plain and ordinary usage, the terms "about," "around," "approximately," and "substantially," when used to modify a value, number, figure, quantity, or other term, can be understood to mean±20% of the modified value, inclusive. For instance, if not sufficiently clear from contextual or plain and ordinary usage, "about 10" can be understood to mean "from 8 to 12 inclusive". If not sufficiently clear from contextual or plain and ordinary usage, the term "relatively" is used to indicate that one of ordinary skill in the art would more closely associate the described value or modifier with the term it modifies (such as high) than another term in a similar class of words (such as low or medium). For instance, if a temperature is described as being "relatively high," one of ordinary skill in the art would more closely associate said temperature with "high" temperatures than "medium" or "low" temperatures. In another example, if a tire pressure between 30-33 psi is considered "standard," then the term "relatively low pressure" would indicate that the stated pressure would be more readily identified by one of ordinary skill in the art as being "low" than being "standard;" for instance, 26 psi.

As used herein, "and/or" is meant to include all possible permutations of "and" and "or". "And/or" may indicate every element of a specified grouping, combinations of less than all elements, or one element. For example, A, B, and/or C can mean any single one of A, B, or C; A and B but not C, B and C but not A, A and C but not B; and A, B, and C together.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for predictive ledger generation, the apparatus comprising:
a processor; and
a memory communicatively coupled with the processor, the memory containing instructions stored thereon, the instructions configuring the processor to:
receive a ledger file containing ledger data;
classify the ledger file to a ledger type, wherein classifying the ledger file further comprises:
receiving ledger training data correlating a plurality of ledger data types with a plurality of ledger classification types;
training a ledger classification machine learning model with the ledger training data;
outputting the one or more ledger classifications by:
inputting the ledger file into the trained ledger classification machine learning model; and
receiving the one or more segment trendlines as outputs from the trained ledger classification machine learning model; and
identify one or more trends in the ledger data, wherein identifying the one or more trends in the ledger data further comprises:
segmenting the ledger data into one or more trend segments based on the identified one or more trends
fitting one or more segment trendlines to each of the one or more trend segments, wherein fitting the one or more segment trendlines to each of the one or more trend segments further comprises:
receiving trendline training data correlating a plurality of trendline types with a plurality of segment types;
training a trendline fit machine learning model with the trendline training data; and
outputting the one or more segment trendlines by:
inputting the trend segments to the trained trendline fit machine learning model; and
receiving the one or more segment trendlines as outputs; and
generating at least one predictive trendline based on the segment trendlines.

2. The apparatus of claim 1, wherein the processor is configured to optimize the at least one predictive trendline based on input received from a user through a user interface.

3. The apparatus of claim 1, wherein the processor is further configured to:
identify one or more external events influencing the ledger data; and
segment the ledger data into one or more trend segments as a function of the one or more external events.

4. The apparatus of claim 3, wherein the processor is further configured to minimize an effect of the one or more external events on the ledger data.

5. The apparatus of claim 1, wherein the processor is further configured to select one or more elements of the ledger data to store to the blockchain based on the ledger type.

6. The apparatus of claim 1, wherein the processor is further configured to classify the ledger file to a ledger type based on a pecuniary parameter.

7. The apparatus of claim 6, wherein the pecuniary parameter corresponds to both of an insurance parameter and an investment parameter.

8. A method for predictive ledger generation, the method comprising:
receiving, by a processor, a ledger file containing ledger data;
classifying, by the processor, the ledger file to a ledger type, wherein classifying the ledger file to the ledger type further comprises:
receiving, by the processor, ledger training data correlating a plurality of ledger data types with a plurality of ledger classification types;
training, by the processor, a ledger classification machine learning model with the ledger training data; and
outputting, by the processor, the one or more ledger classifications by:
inputting the ledger file into the trained ledger classification machine learning model; and
receiving the one or more segment trendlines as outputs from the trained ledger classification machine learning model; and
analyzing, by the processor, the ledger file to identify one or more trends in the ledger data, wherein analyzing the ledger file further comprises:
segmenting, by the processor, the ledger data into one or more trend segments based on the identified one or more trends;
fitting, by the processor, one or more segment trendlines to each of the one or more trend segments, wherein fitting the one or more segment trendlines further comprises:
receiving, by the processor, trendline training data correlating a plurality of trendline types with a plurality of segment types;
training, by the processor, a trendline fit machine learning model with the trendline training data; and
outputting, by the processor, the one or more segment trendlines by:
inputting the trend segments to the trained trendline fit machine learning mode; and
receiving the one or more segment trendlines as outputs from the trained trendline fit machine learning model; and
generating, by the processor, at least one predictive trendline based on the segment trendlines.

9. The method of claim 8, further comprising optimizing, by the processor, the at least one predictive trendline based on input received from a user through a user interface.

10. The method of claim 8, further comprising segmenting, by the processor, the ledger data into one or more trend segments by identifying one or more external events influencing the ledger data.

11. The method of claim 10, further comprising minimizing, by the processor, an effect of the one or more external events on the ledger data.

12. The method of claim 8, further comprising selecting, by the processor, one or more elements of the ledger data to store to the immutable sequential listing based on the ledger type.

13. The method of claim 8, further comprising classifying, by the processor, the ledger file to a ledger type based on a pecuniary parameter.

14. The method of claim 13, wherein the pecuniary parameter corresponds to both of an insurance parameter and an investment parameter.

15. The apparatus of claim 1, wherein fitting the one or more segment trendlines to each of the one or more trend segments further comprises:
- determining a plurality of coefficients for the one or more fitted segment trendlines by iterating an optimization;
- generating a plurality of weighted segment trendlines with the plurality of coefficients;
- training the trendline fit machine learning model iteratively with the trendline training data and the plurality of weighted segment trendlines.

16. The method of claim 8, wherein fitting the one or more segment trendlines further comprises:
- determining a plurality of coefficients for the one or more fitted segment trendlines by iterating an optimization;
- generating a plurality of weighted segment trendlines with the plurality of coefficients;
- training the trendline fit machine learning model iteratively with the trendline training data and the plurality of weighted segment trendlines.

17. The apparatus of claim 1, wherein the ledger file is stored to an immutable sequential listing as a function of the ledger type and the identified one or more trends.

18. The method of claim 8, wherein the ledger file is stored, by the processor, to an immutable sequential listing as a function of the ledger type and the identified one or more trends.

* * * * *